US009889560B2

(12) United States Patent
Maeda

(10) Patent No.: US 9,889,560 B2
(45) Date of Patent: Feb. 13, 2018

(54) ROBOT SYSTEM FOR OPERATING ROBOT FROM PLURALITY OF TEACHING DEVICES

(71) Applicant: FANUC CORPORATION, Yamanashi (JP)

(72) Inventor: Keita Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 15/243,859

(22) Filed: Aug. 22, 2016

(65) Prior Publication Data

US 2017/0057083 A1 Mar. 2, 2017

(30) Foreign Application Priority Data

Aug. 27, 2015 (JP) .................. 2015-167960

(51) Int. Cl.
*G06F 19/00* (2011.01)
*B25J 9/16* (2006.01)

(52) U.S. Cl.
CPC .................... *B25J 9/161* (2013.01)

(58) Field of Classification Search
CPC ....................................... B25J 9/161
USPC ............................... 700/245, 264
See application file for complete search history.

(56) References Cited

U.S. PATENT DOCUMENTS

| 5,366,896 A * | 11/1994 | Margrey .......... G01N 35/00871 422/105 |
| 6,169,981 B1 * | 1/2001 | Werbos .............. G05B 13/0265 706/15 |
| 9,393,491 B2 * | 7/2016 | Barney .................. A63H 30/04 |
| 9,480,534 B2 * | 11/2016 | Bowling .................. B25J 13/00 |
| 9,775,682 B2 * | 10/2017 | Quaid .................... A61B 34/30 |
| 2005/0166413 A1 * | 8/2005 | Crampton .............. B25J 13/088 33/503 |
| 2017/0011210 A1 * | 1/2017 | Cheong ................. H04W 12/06 |

FOREIGN PATENT DOCUMENTS

| JP | 05-046631 A | 2/1993 |
| JP | 2006-011936 A | 1/2006 |
| JP | 2007-199940 A | 8/2007 |
| JP | 5011474 B2 | 8/2012 |
| JP | 2015-44280 A | 3/2015 |
| JP | 2015-141625 A | 8/2015 |

* cited by examiner

*Primary Examiner* — Ronnie Mancho
(74) *Attorney, Agent, or Firm* — Hauptman Ham, LLP

(57) ABSTRACT

It is assumed that when a first teaching device is communicating with an active task unit in a robot control device, a second teaching device transmits a request to connect to the active task unit, to the robot control device. In such a case, the robot control device is configured to stop the first teaching device executing active tasks, and establish communication between the second teaching device and the active task unit of the robot control device which allows active tasks to be executed thereby.

3 Claims, 4 Drawing Sheets

ROBOT SYSTEM FOR OPERATING ROBOT FROM PLURALITY OF TEACHING DEVICES

RELATED APPLICATIONS

The present application claims priority to Japanese Patent Application Number 2015-167960 filed Aug. 27, 2015, the disclosure of which is hereby incorporated by reference herein in its entirety.

BACKGROUND OF THE INVENTION

1. Field of the Invention

The present invention relates to a robot system in which a robot control device and a teaching device are interconnected so as to communicate with each other.

2. Related Art

In a robot system, a teaching device is provided with the robot control device which controls the robot. The teaching device is used when the robot is actually operated by an operator and the operation is recorded in the robot control device. Generally, a teaching device and a robot control device are connected to each other through a communication medium such as a network or a cable.

In such a robot system, when executing active tasks in the robot control device from the teaching device, it is necessary to execute active tasks by only one teaching device. Such prior art for a robot system is disclosed in Japanese Patent No. 5011474.

Namely, Japanese Patent No. 5011474 discloses a robot system in which when one of the at least two teaching devices communicates with the robot control device and executes an active task in the robot control device, another teaching device is prevented from communicating to the robot control device for the purpose of executing active tasks.

Note that the aforementioned "active tasks" are tasks which carry out processing for actually operating the robot such as a JOG operation or running an operation program.

However, in the robot system disclosed in Japanese Patent No. 5011474, when an active task in the robot control device is executed by another teaching device in place of one teaching device, it is necessary for the operator to confirm that one teaching device is not executing an active task.

In the case that the one teaching device is executing an active task in the robot control device, before starting a communication of another teaching device with the control device for the purpose of executing an active task, it is necessary for the operator to cut off the communication of the one teaching device with the robot control device for the purpose of executing an active task.

It is not easy for an operator to carry out these operations because it is necessary for the operator to sufficiently understand the internal function of the robot control device.

SUMMARY OF THE INVENTION

The present invention provides a robot system which can simplify the work required for switching between at least two teaching devices capable of executing actives tasks in a robot control device, thereby improving work efficiency.

According to a first aspect there is provided a robot system comprising at least one robot control device which controls a robot, and at least two teaching devices which allows connection to the robot control device via a communication medium, wherein the robot control device comprises an active task unit which executes an active task, wherein, when one teaching device of the at least two teaching devices is communicating with the active task unit inside the robot control device, if a request for connecting to the active task unit is transmitted from another teaching device of the at least two teaching devices to the robot control device, the robot control device is configured to stop the one teaching device executing an active task, and establish communication allowing an active task to be executed between another teaching device and the active task unit of the robot control device.

According to a second aspect of the present invention there is provided the robot system according to the first aspect, wherein the robot control device further comprises a passive task unit which executes passive tasks, wherein the robot control device is configured to stop the one teaching device executing active tasks, and establish not only communication between another teaching device and the active task unit of the robot control device to allow active tasks to be executed, but also communication between the one teaching device and the passive task unit of the robot control device to allow passive tasks to be executed thereby.

According to a third aspect of the present invention there is provided the robot system according to the first or second aspect, wherein the robot control device is configured to deprive the one teaching device of the authority to execute active tasks while maintaining communication with the one teaching device, to cut off communication with the one teaching device, or to switch the state of the teaching device from being logged in to being logged off the active task unit, in order to stop the one teaching device from executing active tasks.

According to a fourth aspect of the present invention there is provided the robot system according to the first or second aspect, wherein, when the one teaching device communicates with the active task unit inside the robot control device, if another teaching device transmits a request to the robot control device to connect to the active task unit, the robot control device or each of the teaching devices is configured to be selectable whether or not to permit the connection request.

BRIEF DESCRIPTION OF THE DRAWINGS

The objects, features, and advantages and other objects, features and advantages of the present invention will become more apparent from the following detailed description of the exemplary embodiments of the present invention illustrated in the accompanying drawings in which.

DETAILED DESCRIPTION

Figure 1A:
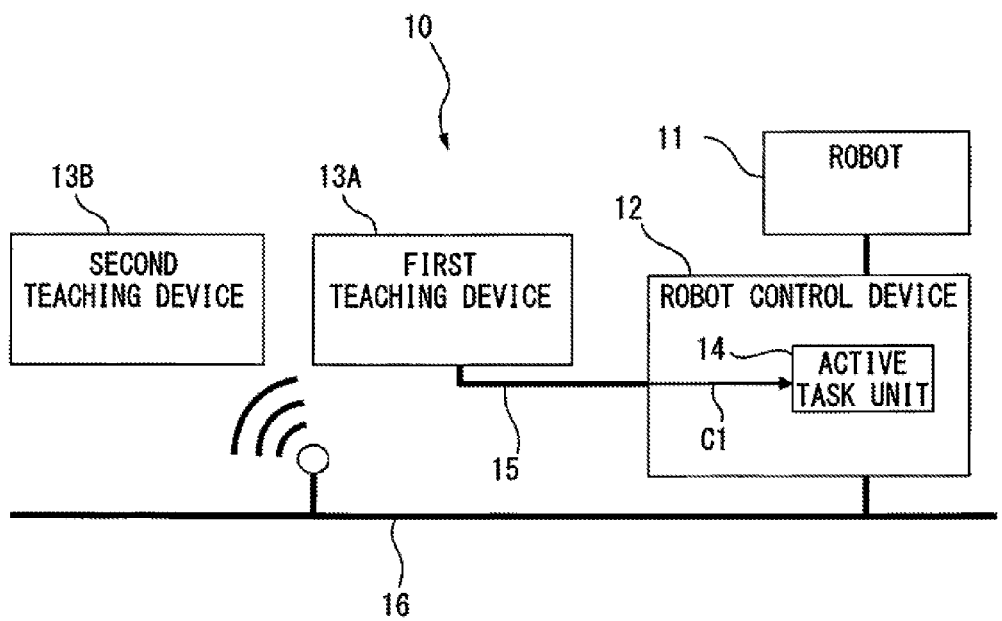
FIG. 1A is a conceptual diagram of the robot system of a first embodiment, showing the first teaching device connected for communication to the robot control device.

Hereinafter, embodiments of the present invention will be described referring to the drawings. The same reference numerals for the same or corresponding constitutional elements are used over the drawings, with the meaning that the constitutional elements have the same function. Further, the scale of the drawings showing the constitutional elements of the illustrated embodiments has appropriately been adjusted so as to facilitate the understanding of the present inventions.

First Embodiment

Figure 1B:
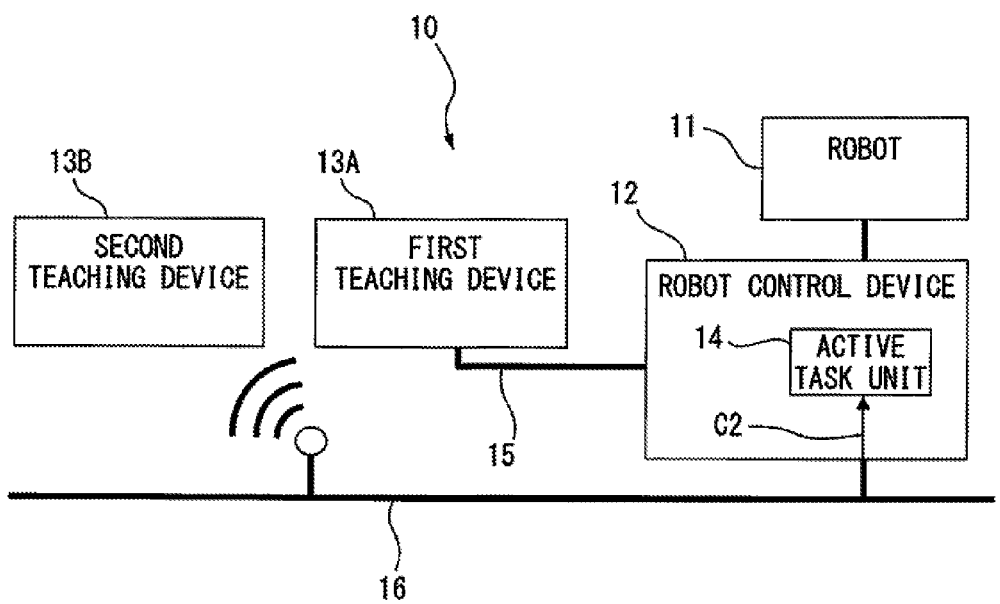
FIG. 1B is a conceptual diagram of the robot system of the first embodiment, showing the second teaching device connected for communication to the robot control device.

FIG. 1A and FIG. 1B are conceptual diagrams of the robot system 10 of the first embodiment.

The robot system 10 comprises a robot control device 12, which controls the robot 11, and two teaching devices 13A and 13B which can be connected to the robot control device 12. Note that the number of the robots 11, the robot control devices 12 and the teaching devices 13A, 13B illustrated, is not limited in the present invention. It is acceptable for the present invention to comprise at least one robot 11, at least one robot control device 12 which controls the at least one robot 11, and at least two teaching devices 13A and 13B.

The robot 11 may be, for example, a vertical articulated manipulator. The teaching devices 13A and 13B are teaching pendants capable of driving a motor (not shown) on each axis of the robot 11 through manual operations. Further, the robot control device 12 comprises an active task unit 14 which stores active tasks and executes active tasks by commands from the teaching devices 13A and 13B. "Active tasks" are tasks such as performing a JOG operation by the robot 11 or running an operation program.

Further, the robot control device 12 and each of the teaching devices 13A and 13B are connected to each other via a communication medium such as a cable 15 or a network 16. The network 16 may be Ethernet (registered trademark) or wireless LAN, etc.

Specifically, FIG. 1A shows the first teaching device 13A connected for communication to the robot control device 12 via the cable 15. In this state, the first teaching device 13A communicates with the active task unit 14 in the robot control device 12 so that active tasks can be executed by the first teaching device 13A. On the other hand, FIG. 1B shows the second teaching device 13B connected for communication to the robot control device 12 via the network 16. In this state, the second teaching device 13B communicates with the active task unit 14 in the robot control device 12 so that active tasks can be executed by the second teaching device 13B.

In the present application, only one of the at least two teaching devices 13A and 13B can communicate with the active task unit 14 inside the robot control device 12. A detailed description regarding this point follows.

As shown in FIG. 1A, the first teaching device 13A carries out communication C1 with the active task unit 14 inside the robot control device 12 via the cable 15, in order to execute an active task. At this time, communication from the second teaching device 13B to the active task unit 14 inside the robot control device 12 is cut off. Further, if the second teaching device 13B transmits a request to connect to the active task unit 14 to the robot control device 12 via the network 16, the robot control device 12 stops the first teaching device 13A executing active tasks.

As a method of stopping active tasks from being executed, for example, depriving the first teaching device 13A of the authority to execute active tasks while maintaining communication with the first teaching device 13A with the robot control device 12; or cutting off communication between the first teaching device 13A and the robot control device 12 may be considered. Alternatively, it may be possible to switch the state of the first teaching device 13A from being logged-in, to being logged-off with respect to the active task unit 14 in order to execute and stop the active tasks. Namely, when executing an active task, the teaching devices 13A and 13B each log in to the active task unit 14 of the robot control device 12. When stopping a teaching device executing an active task, it is preferable that the robot control device 12 forces the change in state of the teaching device from being logged-in, to being logged-off.

In the case of the present embodiment, when a request for connection to the active task unit 14 is transmitted from the second teaching device 13B to the robot control device 12, as described above, the communication C1 from the first teaching device 13A to the active unit 14 of the robot control device 12 is cut off by the robot controller device 12. At the same time, a communication C2 is established by the robot control device 12 between the second teaching device 13B and the active task unit 14 of the robot control device 12. Accordingly, the teaching device capable of executing active tasks in the robot control device 12 is the second teaching device 13B.

That is, in the first embodiment, when a connection request for executing active tasks is transmitted from the second teaching device 13B to the robot control device 12, the robot control device 12 stops the active tasks of the first teaching device 13A. At the same time, the robot control device 12 automatically establishes a communication C2 for allowing active tasks between the second teaching device 13B and the active task unit 14 of the robot control device 12.

Therefore, according to the robot system 10 of the first embodiment, the operation for switching between the two teaching devices 13A and 13B which are capable of executing active tasks in the robot control device 12, is simplified. Hence, the work efficiency of the operator is improved.

Second Embodiment

Next, the second embodiment of the present invention will be described. Note that the following description will mainly describe differences from the aforementioned first embodiment. Constituent elements which are the same as those in the aforementioned first embodiment are given the same reference numerals and descriptions therefor are omitted.

Figure 2A:
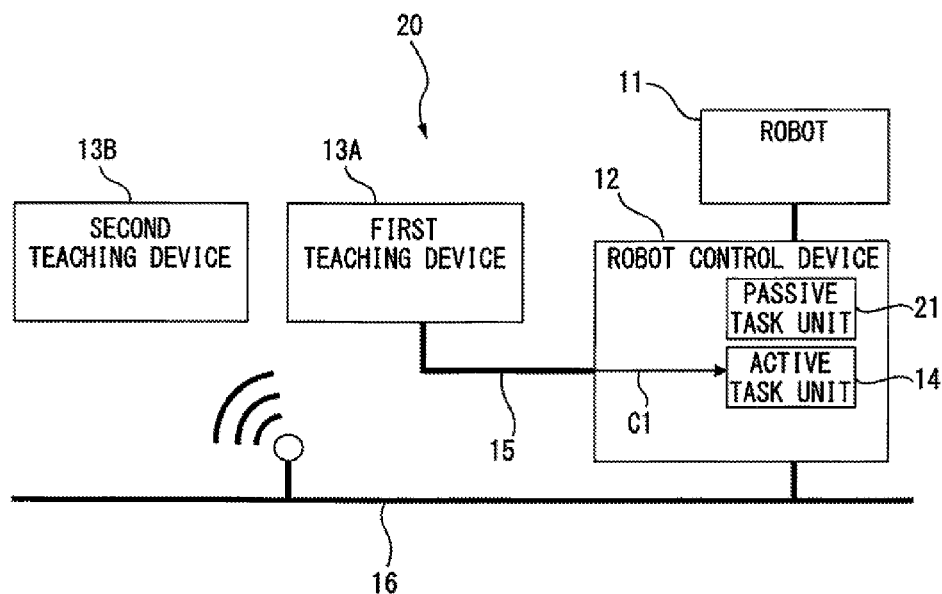
FIG. 2A is a conceptual diagram of the robot system of a second embodiment, showing the first teaching device connected for communication to the robot control device.
Figure 2B:
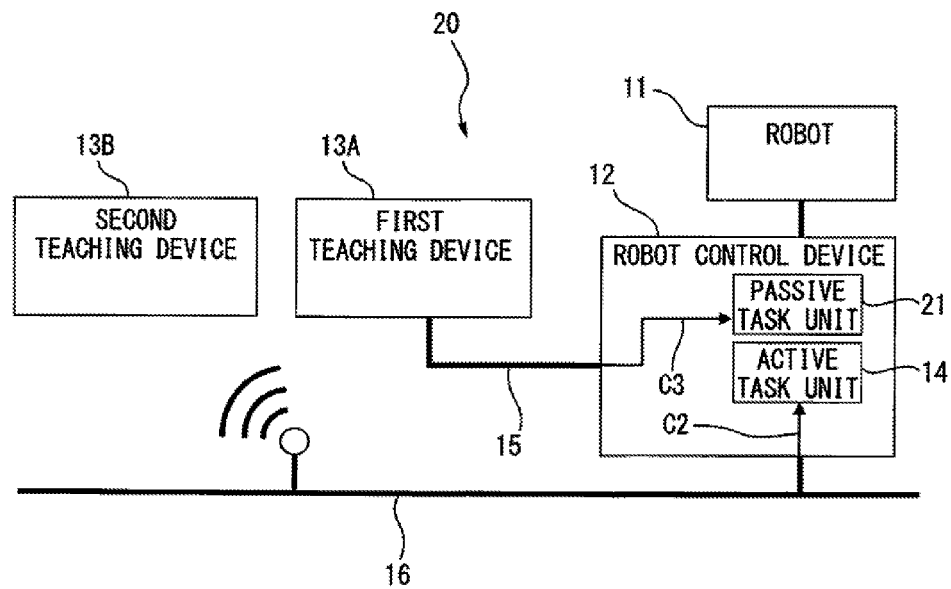
FIG. 2B is a conceptual diagram of the robot system of the second embodiment, showing the second teaching device connected for communication to the robot control device.

FIG. 2A and FIG. 2B are conceptual diagrams of the configuration of the robot system 20 of the second embodiment.

A display screen (not shown) which displays an operation menu for the robot control device 12 or the state of the robot 11, for example the position of the joint axes etc. may be provided for each of the teaching devices 13A and 13B. Tasks for carrying out such displays on the display screen, operating the displayed screen, to change the system settings, are referred to as "passive tasks". With respect to active tasks which carry out processing of operations (JOG or execution of programs) of the robot, passive tasks refer to carrying out processing of all tasks excluding the processing of operations of the robot. In the robot system 20 of the second embodiment, as shown in FIG. 2A and FIG. 2B, the active task unit 14 and the passive task unit 21 are provided in the robot control device 12. The passive task unit 21 stores the aforementioned passive tasks, and executes the passive tasks in response to commands from the teaching device 13A or 13B. Note that except for these points, the constitutional elements of the second embodiment of the robot system 20 are identical to those of the first embodiment.

Next, the control functions of the robot control device 12 of the second embodiment will be described. The control method for when the robot control device 12, and each of the first teaching device 13A and the second teaching device 13B are connected for communication, will be described.

In FIG. 2A, the first teaching device 13A carries out communication C1 for the purpose of executing active tasks with the active task unit 14 in the robot control device 12 via the cable 15. At this time, communication from the second teaching device 13B to the active task unit 14 in the robot control device 12 is cut off. Further, when a request to connect to the active task unit 14 is transmitted from the second teaching device 13B to the robot control device 12 via the network 16, the robot control device 12 stops the first teaching device 13A from executing active tasks. For example, the robot control device 12 cuts off the communication C1 from the first teaching device 13A to the active task unit 14 of the robot control device 12.

At the same time as the active tasks executed by the first teaching device 13A are stopped, the robot control device 12, as shown in FIG. 2B, establishes communication C2 between the second teaching device 13B and the active task unit 14 of the robot control device 12. At this time, the robot control device 12 of the second embodiment, as shown in FIG. 2B, switches the communication between the first teaching device 13A and the robot control device 12 to communication C3 between the first teaching device 13A and the passive task unit 21 of the robot control device 12. Accordingly while, passive tasks executed by the first teaching device 13A are preserved, the teaching device capable of executing active tasks in the robot control device 12 becomes only the second teaching device 13B.

Namely, in the aforementioned second embodiment, when a connection request for executing active tasks is transmitted from the second teaching device 13B to the robot control device 12, the robot control device 12 stops the first teaching device 13A from executing active tasks. At the same time, not only does the robot control device 12 automatically establish a communication C2 for carrying our active tasks between the second teaching device 13B and the robot control device 12, but also automatically establishes a communication C3 to execute passive tasks between the first teaching device 13A and the robot control device 12.

Therefore, the robot system 20 of the second embodiment, like the robot system 10 of the first embodiment, can improve the work efficiency for switching between the two teaching devices 13A and 13B which are capable of executing active tasks in the robot control device 12.

Specifically, in the second embodiment, even if the first teaching device 13A is stopped from carrying out active tasks, the first teaching device 13A is able to communicate with the passive task unit 21 of the robot control device 12 to execute passive tasks. Therefore, an operator may monitor the display screen of the first teaching device 13A, and transmit a connection request from the first teaching device 13A to the robot control device 12 to again execute active tasks.

Third Embodiment

Next, the third embodiment of the present invention will be described. Note that the following description will mainly describe differences from the aforementioned first and second embodiments. Constituent elements which are the same as those in the aforementioned first and second embodiments are given the same reference numerals and descriptions therefor are omitted.

Figure 3:
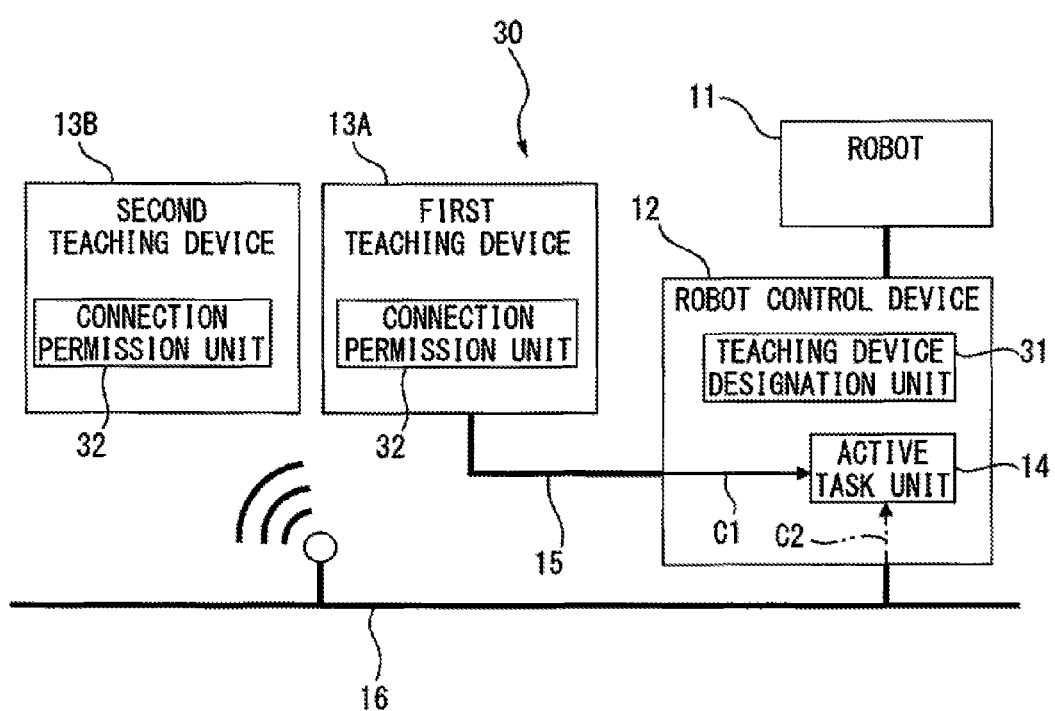
FIG. 3 is a conceptual diagram of the robot system of a third embodiment.

FIG. 3 is a conceptual diagram of the configuration of the robot system 30 of the third embodiment. In the robot system 30 of the third embodiment, as shown in FIG. 3, a teaching device designation unit 31 and the active task unit 14 are provided in the robot control device 12. The teaching device designation unit 31 is a means for designating the teaching device to be connected to the active task unit 14 in the robot control device 12.

Methods for designating the teaching device, using the IP address (Internet protocol address) or the Mac address (Media access control address) of the second teaching device 13B connected to the network, or IDs assigned to each of the teaching devices 13A and 13B, etc., may be considered.

Further, the robot control device 12 connects only the teaching device designated by the teaching device designation unit 31 to the active task unit 14 in the robot control device 12. For example, if the IP address of the teaching device executing active tasks in the robot control device 12 is used for designation, it is assumed that the IP address of the second teaching device 13B is not designated by the teaching device designation unit 31. In such a case, even if a connection request for executing active tasks is transmitted from the second teaching device 13B to the robot control device 12, such a connection request is rejected by the robot control device 12. Of course the communication C2 from the second teaching device 13B to the active task unit 14 of the robot control device 12 is not established.

Therefore, the operator is able to select whether or not to allow a connection request from a teaching device by designating the teaching device connected to the active task unit 14 in the robot control device 12 by using the teaching device designation unit 31.

Further, in the robot system 30 of the third embodiment, it is preferable that each of the teaching devices 13A and 13B be provided with a connection permission unit 32 which permits the connection request from the unconnected teaching device 13A or 13B to the robot control device 12.

For example, it is assumed that when the first teaching device 13A has the authority to execute active tasks in the robot control device 12, a request to connect to the active unit 14 is transmitted from the second teaching device 13B to the robot control device 12. In such a case, the connection request is notified from the robot control device 12 to the first teaching device 13A. Thus, the operator can select whether or not to permit the connection request with the connection permission unit 32 of the first teaching device 13A. Further, if the operator permits the connection request, the authority to execute active tasks in the robot control device 12 is transferred from the first teaching device 13A to the second teaching device 13B. On the other hand, if the operator rejects the connection request, the authority to execute active tasks in the robot control device 12, remains with the first teaching device 13A.

Furthermore, the aforementioned teaching device designation unit 31 and the connection permission unit 32 can also be applied to the robot system 20 of the second embodiment.

Figure 4:
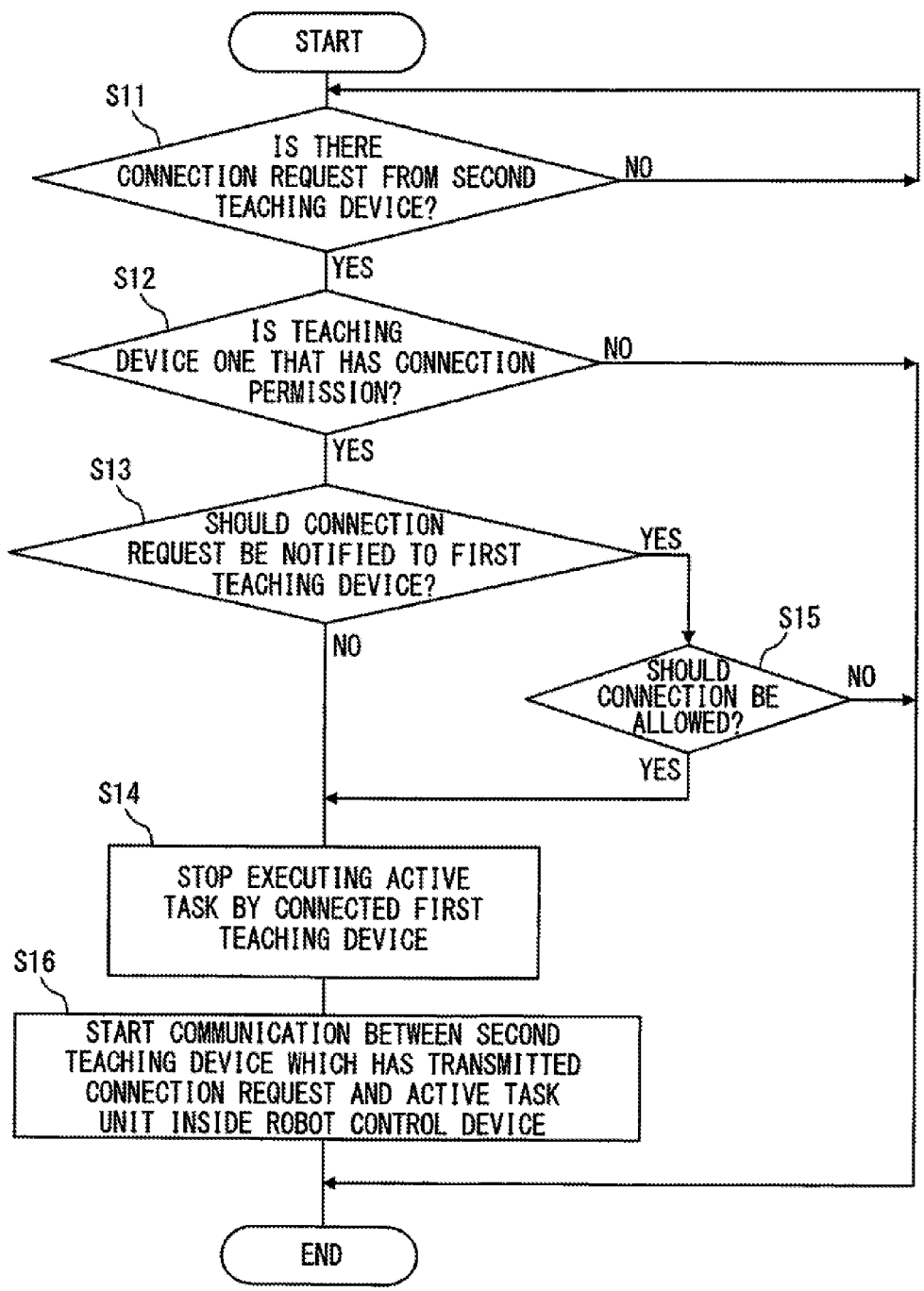
FIG. 4 is a flow chart showing one example of control flow of the robot system of the third embodiment when the first teaching device or the second teaching device is connected for communication to the robot control device.

Next, in the robot system 30 of the aforementioned third embodiment, an example of the control flow when communication connection is established between the first teaching device 13A or the second teaching device 13B and the robot control device 12 will be described. FIG. 4 is a flow chart illustrating the example.

In the robot system 30 shown in FIG. 3, the first teaching device 13A communicates with the active task unit 14 in the robot control device 12 so that the first teaching device 13A can execute active tasks. In this state, the robot control device 12 first determines whether or not the second teaching device 13B has requested connection (step S11 of FIG. 4).

Next, in the above step S11, if it is determined that there is a connection request, the robot control device 12 determines whether or not the second teaching device 13B which has transmitted the connection request is the teaching device for which connection is permitted (step S12 of FIG. 4). At this time, whether or not the second teaching device 13B is the teaching device which has been designated beforehand by the teaching device designation unit 31 illustrated in FIG. 3, is determined.

Further, if it is determined that the teaching device 13B has been permitted to be connected, the robot control device 12 determines whether or not to notify the first teaching device 13A of the aforementioned connection request (step S13 of FIG. 4). Notification processing of a connection request to the teaching device 13A or 13B is carried out in the case that each of the teaching devices 13A and 13B is provided with a connection permission part as shown in FIG. 3. Therefore, when a connection permission unit 32 is not provided, in the above step S13, it is determined that the first teaching device 13A not be notified of the aforementioned connection request. If it determined that the first teaching device 13A not be notified of the connection request, the robot control device 12 stops the first teaching device 13A, to which it is connected, from executing active tasks (step S14 of FIG. 4).

On the other hand, in the above step S13, if it is determined that the aforementioned connection request be notified to the first teaching device 13A, the robot control device 12 determines whether or not the operator has permitted the connection between the second teaching device 13B and the robot control device 12 (step S15 of FIG. 4). At this time, the robot control device 12 determines whether or not connection permission has been selected in the connection permission unit 32 as shown in FIG. 3. Further, in step S15, if the operator has permitted connection, the robot control device 12 performs the processing of step S14.

Next, the robot control device 12 starts communication between the second teaching device 13B which has transmitted the connection request, and the active task unit 14 in the robot control device 12 (step S16 of FIG. 4). Namely, the robot control device 12 establishes communication from the second teaching device 13B to the active task unit 14 in the robot control device 12 for the purpose of executing active tasks.

According to the aforementioned robot system 30 of the third embodiment, the teaching device designation unit 31 of the robot control device 12, or the connection permission units 32 of the teaching devices 13A and 13B, can select whether or not to permit the connection request from each of the teaching devices 13A and 13B.

Accordingly, when an operator is operating the robot 11 by using the first teaching device 13A, the risk of the authority to execute active tasks being forcefully taken by the second teaching device 13B can be eliminated.

Above, typical embodiments have been discussed to describe the present invention. However, without departing from the scope of the present invention, a person skilled in the art would understand that each of the above embodiments may be changed, and that various other changes, omissions and additions may be carried out. Further, the appropriate combination of the aforementioned embodiments is also included in the scope of the invention.

Effects of the Invention

According to the first and third aspects of the present invention, assuming that when one of the teaching devices is communicating with the active task unit of the robot control device, there is a connection request from another teaching device to the robot control device to execute active tasks, active tasks executed by the one teaching device are stopped, and a communication between another teaching device and the active task unit of the robot control device is automatically established. Accordingly the work required to switch between two teaching devices capable of executing active tasks in the robot control device is simplified and the work efficiency of an operator can be improved.

According to the second aspect of the present invention, even if one teaching device is stopped from executing active tasks, the one teaching device can still perform communication to execute passive tasks with the passive task unit in the robot control device. Accordingly, the operator can monitor the display screen of the one teaching device and transmit a connection request from the one teaching device to the robot control device to execute active tasks again.

According to the fourth aspect of the present invention, the robot control device or each of the teaching devices can select whether or not to permit the connection request from the teaching device.

Accordingly, when an operator is operating a robot using one of the teaching devices, the risk of another teaching device forcefully taking over the authority to execute active tasks is eliminated.

The invention claimed is:

1. A robot system comprising:
   at least one robot control device which controls a robot; and
   at least two teaching devices which allows connection to the robot control device via a communication medium, wherein
   the robot control device comprises:
   an active task unit which executes an active task, and
   a passive task unit which executes passive tasks, wherein,
   when one teaching device of the at least two teaching devices is communicating with the active task unit inside the robot control device, if a request for connecting to the active task unit is transmitted from another teaching device of the at least two teaching devices to the robot control device, the robot control device is configured to stop the one teaching device executing an active task, establish communication allowing an active task to be executed between the other teaching device and the active task unit of the robot control device, and simultaneously establish communication allowing passive tasks to be executed between the one teaching device stopped executing the active task and the passive task unit of the robot control device.

2. The robot system according to claim 1, wherein
   the robot control device is configured to deprive the one teaching device of the authority to execute active tasks while maintaining communication with the one teaching device; to cut off communication with the one teaching device; or to switch the state of the teaching device from being logged in to being logged off the active task unit, in order to stop the one teaching device executing active tasks.

3. The robot system according to claim 1, wherein, when the one teaching device communicates with the active task unit inside the robot control device, if the other teaching device transmits a request to the robot control device to connect to the active task unit, the robot control device or each of the teaching devices is configured to be selectable whether or not to permit the connection request.

* * * * *